United States Patent [19]

El Taher et al.

[11] 4,126,218

[45] Nov. 21, 1978

[54] TRANSPORTATION APPARATUS WITH PROTECTIVE ARRANGEMENT FOR COMBPLATE TEETH

[75] Inventors: Mohamed A. El Taher, Highland Township, Adams County; Matthew G. Bertovich, Monroeville, both of Pa.

[73] Assignee: Westinghouse Electric Corp., Pittsburgh, Pa.

[21] Appl. No.: 787,632

[22] Filed: Apr. 14, 1977

[51] Int. Cl.[2] .......................... B66B 9/12; B65G 47/66

[52] U.S. Cl. ...................................................... 198/325

[58] Field of Search .......................... 198/321, 324, 325

[56] References Cited

U.S. PATENT DOCUMENTS 2,110,547 3/1938 Eckerson et al. .................... 198/325
3,137,382 6/1964 Conover ............................. 198/325
3,458,025 7/1969 Earle .................................... 198/325

FOREIGN PATENT DOCUMENTS 195,517 4/1965 Sweden .................................. 198/321

*Primary Examiner*—Evon C. Blunk
*Assistant Examiner*—James L. Rowland
*Attorney, Agent, or Firm*—D. R. Lackey

[57] ABSTRACT

Transportation apparatus including a load bearing conveyor having a plurality of platforms for transporting persons between spaced landings. The platforms include a plurality of longitudinal grooves, and the landings each include a combplate having a plurality of teeth which mesh with the grooves. The combplate includes a portion adjacent the teeth which is dimensioned and positioned to shield the teeth from mechanical stresses when the combplate is subjected to a deflecting load.

6 Claims, 5 Drawing Figures

TRANSPORTATION APPARATUS WITH PROTECTIVE ARRANGEMENT FOR COMBPLATE TEETH

BACKGROUND OF THE INVENTION

1. Field of the Invention

The invention relates in general to transportation apparatus, and more specifically to passenger conveyors such as escalators and moving walks which have a plurality of steps, platforms, or pallets.

2. Description of the Prior Art

In conveyors for transporting people between spaced landings, such as escalators and moving walks of the type which include a plurality of steps, platforms or pallets, treads of the steps, platforms or pallets are conventionally provided with a plurality of longitudinally extending grooves and cleats. The landings at each end of the escalator or moving walk include combplates which have a plurality of teeth which mesh with the cleats. The teeth are inclined upwardly away from the load bearing portion of the transportation apparatus, to facilitate transfer of passengers between the moving conveyor and the landing.

The combplate is understandably the source of many problems since it provides the interface between the moving conveyor and a stationary landing. There must be a clearance between the moving cleats of the treads and the teeth of the combplate, and they must properly mesh in a manner which minimizes the possibility of objects becoming caught or trapped at this interface.

Many U.S. patents have been issued which relate to different arrangements for improving the combplate. For example, U.S. Pat. No. 2,110,547 discloses that the clearance between the combplate platform and the tops of the cleats may be greater than that between the teeth in the bottom of the tread grooves, because of step tilt due to a heavy load on the rear of the step. This patent also states that depending upon the design of the stairway, these clearances may be the same. This patent then discloses a structure for filling in the space between the bottom of the tread grooves and between the combplate platform and the top of the cleats, to resist the pressure of anything which the tread tries to carry along with it underneath the combplate.

U.S. Pat. No. 3,458,025 discloses a protective, resilient structure which completely covers the teeth of the combplate and which includes resilient fingers which lead the conventional metallic teeth of the combplate in meshing with the cleats of the stairway treads.

U.S. Pat. No. 3,687,257 discloses mounting the combteeth on a slider bar which permits self-alignment of the combteeth in the conveyor grooves.

While these patents all disclose structures which improve certain aspects of the combplate, it would be desirable to provide a new and improved combplate structure which will greatly extend its useful operating life. Further, this desirable result should be obtained without adding significantly to the manufacturing cost thereof, without complicating maintenance of the transportation apparatus, and without adversely affecting the functioning of the combplate.

More specifically, it would be desirable to eliminate, or at least greatly reduce, the breakage of combplate teeth. A heavy person, or a sharp descending blow by a person's foot, may apply a load to the combplate adjacent to the teeth which is sufficient to momentarily deflect the teeth downwardly and cause them to contact and to be mechanically stressed by the moving step, platform or pallet. This may result in immediate breakage of a tooth, or it may start a crack which after repeated stressing of the combplate may cause breakage of the tooth. Tooth breakage may occur due to such deflecting loads regardless of the relative dimensions of the teeth and cleats. For example, it is immaterial whether the teeth of the combplate bottom in the cleat grooves before the cleats contact the tooth grooves, or the cleats contact the tooth groove before the teeth bottom in the cleat grooves, or even if both types of contact occur simultaneously.

SUMMARY OF THE INVENTION

Briefly, the present invention is a new and improved passenger conveyor, such as an escalator or a moving walk. The passenger conveyor includes longitudinally grooved steps, platforms, or pallets, which define a cleated treadboard, and combplates at the landings which have teeth which mesh with the cleats. The combplates include a pad portion, rearwardly of the combplate teeth, which is dimensioned and positioned to contact the cleats before the teeth contact the cleats, or before the teeth bottom in the cleat grooves, when the combplate is subjected to a deflecting load. The combplate is usually constructed to include a tread portion and a tooth portion which is removably fixed to the tread portion. In a preferred embodiment of the invention, the pad portion is located on the underside of the tread portion, immediately adjacent to the adjoining toothed portion. Thus, a deflecting load on the combplate merely causes a momentary contact between the flat pad on the underside of the combplate and the passing step, with no bending stresses being created or applied to the teeth, or to the root portions of the teeth.

BRIEF DESCRIPTION OF THE DRAWING

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
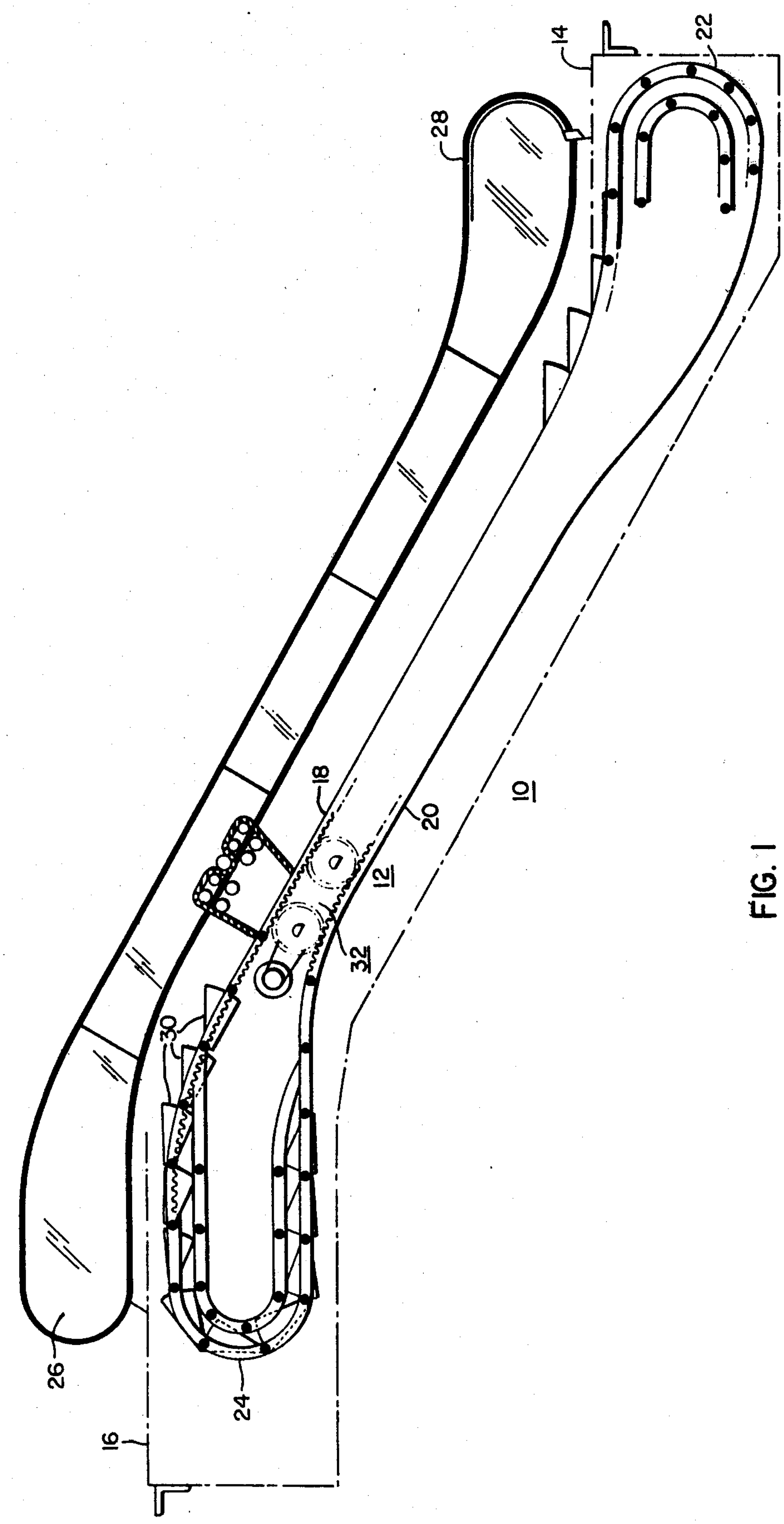
FIG. 1 is an elevational view of transportation apparatus of the type which may be constructed according to the teachings of the invention.

Referring now to the drawings, and FIG. 1 in particular, there is shown transportation apparatus 10 which may utilize the teachings of the invention. While transportation apparatus 10 is illustrated as being an escalator, the invention is equally applicable to moving walks of the type which have an endless series of rigid segments or platforms, commonly called pallets, which are longitudinally grooved on their load bearing surfaces.

Apparatus 10 employs a conveyor portion 12 for transporting persons between a first landing 14 and a second landing 16. Conveyor 12 is of the endless type, having an upper load bearing run 18 upon which the passengers stand while being transported between spaced landings 14 and 16, a lower return run 20, and lower and upper turn-arounds 22 and 24, respectively, which interconnect the upper and lower runs.

A balustrade 26 is disposed above the conveyor 12 for guiding a continuous flexible handrail.

Conveyor 12 includes a plurality of steps 30, only a few of which are illustrated in FIG. 1. The steps 30 are attached to the endless belt 12, and the endless belt 12 is driven by a drive arrangement 32, which also drives the handrail 28. While the drive arrangement 32 is illustrated as being of the modular type disclosed in U.S. Pat. No. 3,677,388, the conveyor 12 may also be driven by a drive located outside of the conveyor loop, such as illustrated in U.S. Pat. No. 3,414,109, both patents of which are assigned to the same assignee as the present application.

Figure 2:
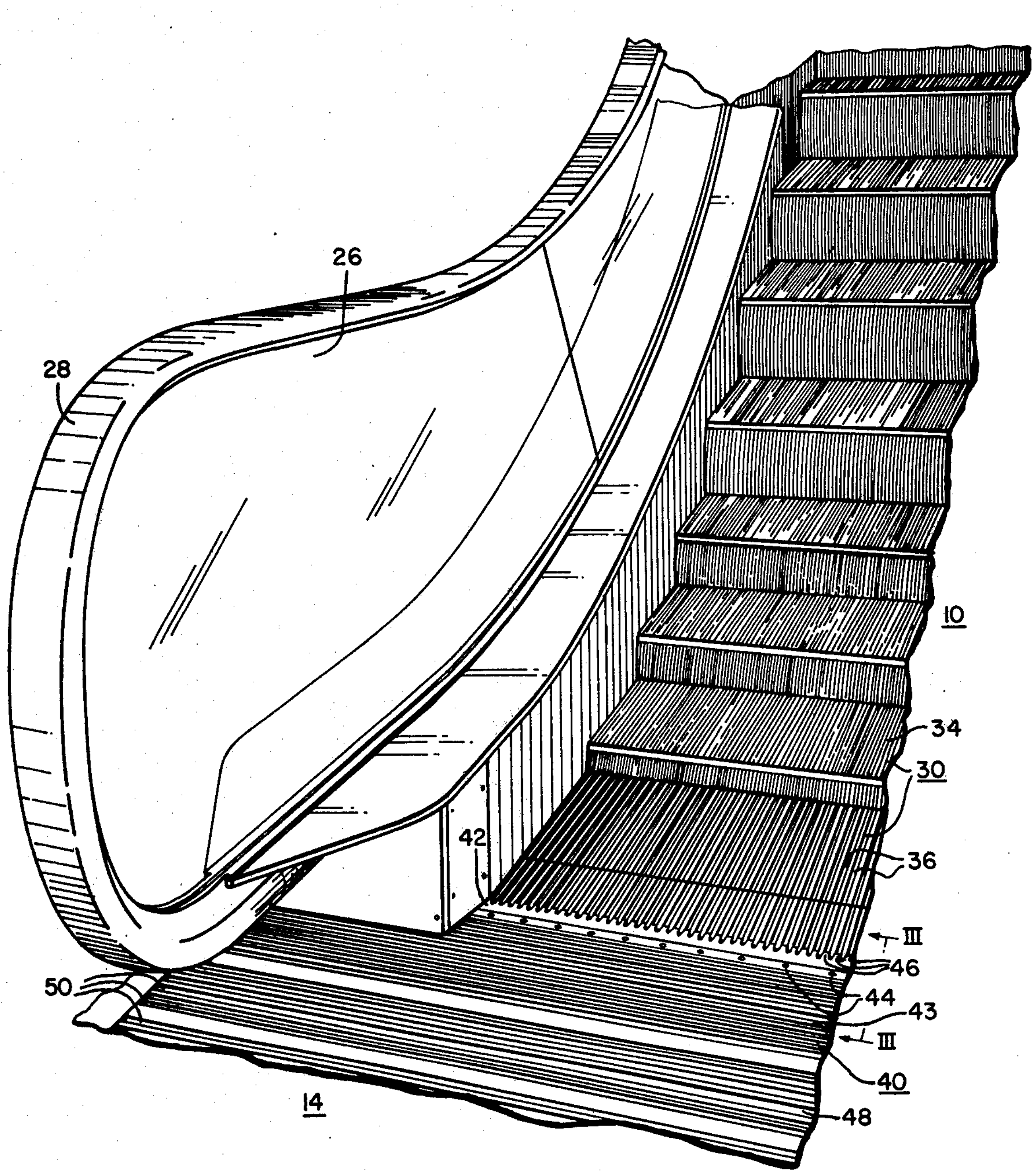
FIG. 2 is a fragmentary, perspective view of the lower landing of the transportation apparatus shown in FIG. 1, illustrating the meshing of the combplate fingers or teeth with the longitudinal grooves of the steps.

Referring now to FIG. 2, which is a fragmentary, perspective view of the lower landing 14 of the transportation apparatus 10 shown in FIG. 1, each of the steps includes a treadboard 34 which is longitudinally grooved, illustrated generally by lines 36. The steps 30 are accurately guided relative to combplate 40, which includes a comb finger assembly 42 suitably fastened to a plate or tread portion 43, such as by screws 44. The comb finger assembly 42 includes a plurality of fingers or teeth 46 which mesh with the longitudinal grooves 36 in the step 30 to provide a smooth transition between a moving step and the stationary combplate 40. A floor plate 48 forms an integral extension of the comb plate 40, with both the comb and floor plates being grooved on their load bearing surfaces, indicated generally at 50.

The comb and floor plates may be assemblies formed of aluminum extrusions, with these assemblies being secured to the truss (not shown) which supports the conveyor 12.

Figure 3:
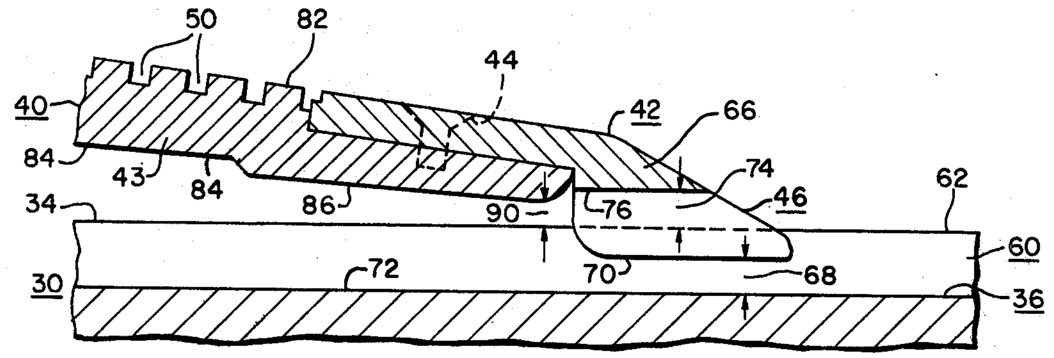
FIG. 3 is a cross-sectional view of the combplate and adjacent step, taken between arrows III—III in FIG. 2, illustrating an embodiment of the invention.
Figure 4:
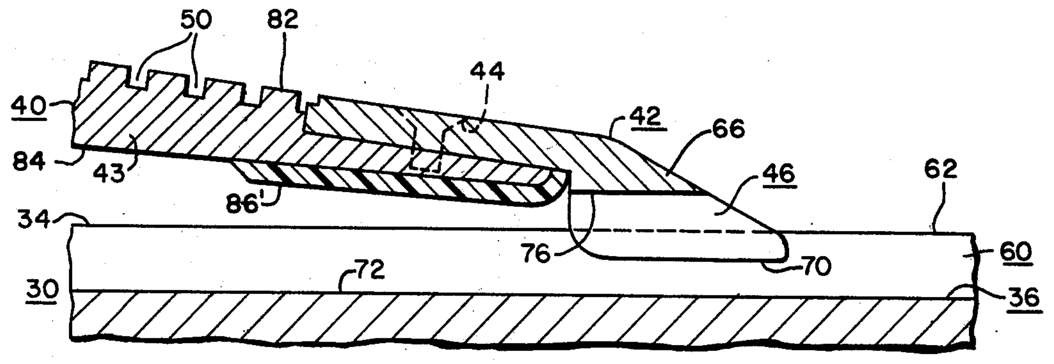
FIG. 4 is a cross-sectional view of the combplate and adjacent step, taken between arrows III—III in FIG. 2, illustrating another embodiment of the invention.
Figure 5:
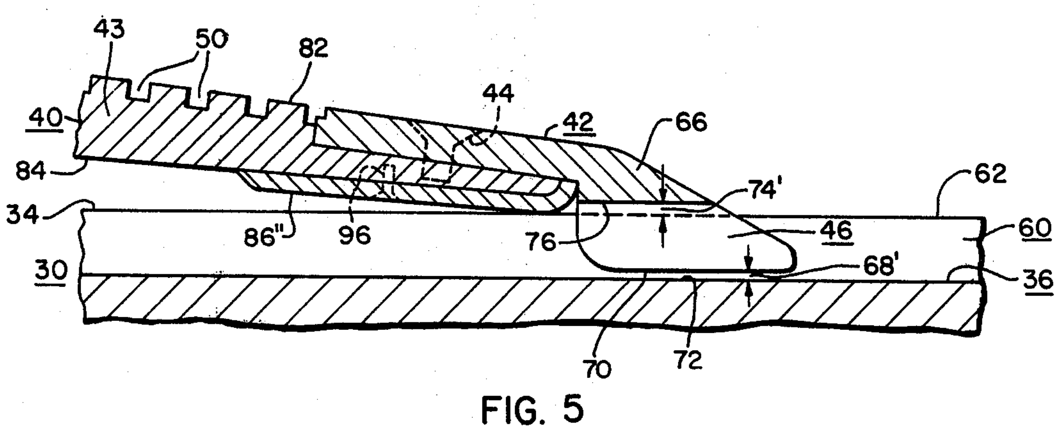
FIG. 5 is a cross-sectional view of the combplate and adjacent step, taken between arrows III—III in FIG. 2, illustrating still another embodiment of the invention.

Referring now to FIGS. 3, 4 and 5, there is shown different embodiments of the invention, with FIGS. 3, 4 and 5 being fragmentary, sectional views of the combplate 40 and a step 30, taken between arrows III—III in FIG. 2.

The treadboard 34 of step 30 includes a plurality of spaced, upstanding cleats 60 having an upper surface 62 which provides the load bearing surface of the treadboard 34. The spaced cleats 60 define the longitudinal grooves 36, hereinbefore referred to.

The comb finger asembly 42 which includes a plurality of spaced teeth 46 is fastened to the forward edge of the plate member 43, such as by the screws 44, which forward edge is inclined to assist passenger transfer between step level and the slightly higher horizontal portions of the comb and floor plates.

Each of the teeth 46 depend from a common support portion 66 and each extends into a longitudinal groove 36 defined by two spaced cleats 60. The teeth 46 are normally positioned to provide a predetermined clearance 68 between the bottom surface 70 of each tooth 46, and the bottom 72 of the associated groove 36, and a predetermined clearance 74 between the surface 76 which extends between adjacent teeth 46 and the top surface 62 of a cleat.

The combplate 40 is necessarily supported along its outer sides to enable the moving steps to pass in close relation adjacent to its lower surface. Thus, a heavy descending blow by a person's foot on the comb finger assembly 42, or a heavy person placing a foot on the combplate assembly 42, will cause a deflection of the comb finger assembly 42. It is desirable to provide as little clearance 68 as possible between the teeth 46 and the bottom 72 of the grooves 36. For example, the groove depth may be 0.437 inch and the clearances 68 and 74 may each be about 0.250 inch. If the bottom 70 of the tooth contacts the bottom 72 of a groove 36, and/or the surface 76 between the teeth 46 contacts the upper surface 62 of a cleat 60, the metallic tooth 46 may break, and it is not uncommon for the mechanical stresses to cause the breakage to occur well back into the common support 66, almost to the location of the screws 44. A broken comb finger assembly must be replaced, resulting in an inconvenient shutdown of the transportation apparatus 10 and a costly service call.

The present invention greatly extends the useful service life of the comb finger assembly 42 by a new and improved dimensional relationship between the plate 43, comb finger assembly 42, and the step 30. The plate 43 of the combplate assembly 40, which includes an upper load bearing surface 82 and a lower surface 84, is modified to include a portion 86 on its lower surface 84 which is dimensioned and spaced relative to the step 30 such that a deflecting load on the combplate will cause the portion 86 to contact the step 30 before any portion of the comb finger assembly 42 can come into contact with the step. Thus, the clearance 90 between portion 86 and the top surface 62 of a cleat 60 is selected to be less than the clearance 68 between the bottom surface 70 of the tooth 46 and the bottom 72 of the groove 36. The clearance 90 is also selected to be less than the clearance 74 between the surface 76 which extends between the teeth 46 and the top surface 62 of a cleat. For example, if the clearances 68 and 74 are each about 0.250 inch, clearance 90 may be about 0.1875 inch.

FIG. 5 illustrates the combplate finger assembly 42 as it would appear under the influence of a heavy deflecting load. Portion 86 contacts the top surface 62 of a cleat, providing a clearance 68' between the surfaces 70 and 72, and a clearance 74' between surfaces 62 and 76.

FIG. 3 illustrates a preferred embodiment of the invention wherein portion 86 is in the form of a pad which is integral with the plate portion 43 of the combplate 40. The pad shaped portion 86 is an easily extruded shape, requiring only a slight modification to the extrusion die which would normally extrude this member of the combplate.

FIGS. 4 and 5 illustrate that the portion 86 may also be in the form of a discrete member, or members, which may easily be added to existing combplate structures. FIG. 4 illustrates a pad portion 86' formed on a nonmetallic material, which may be bonded in the desired position using a suitable adhesive, or otherwise suitably attached. Pad portion 86' may be any suitable tough material, such as a polyamide, or polytetrafluorethylene (nylon and Teflon, respectively).

FIG. 5 illustrates a pad portion 86" formed of metal, such as the same metal of which the combplate is formed, or a different metal which might be selected for its abrasion resistance. Pad portion 86" is illustrated as being attached by screws 96, but any suitable fastening means may be used.

In summary, there has been disclosed new and improved transportation apparatus such as an escalator or a moving walk, of the type which utilizes a combplate at the landings having teeth which mesh with longitudinal grooves in the load bearing steps, platforms, or pallets of the apparatus. A new and improved dimensional relationship greatly extends the useful operating life of the combplate, while adding very little to the initial cost of the apparatus, and without requiring any additional maintenance. Further, the effectiveness of the combplate is not deleteriously affected. The combplate structure to which the comb finger assembly is attached is modified to carry a portion which is dimensioned and positioned to contact the step when the combplate is deflected, before the comb finger assembly contacts the step. This portion may be formed integrally with the combplate, or added thereto as discrete pad-like members.

We claim as our invention:

1. Transportation apparatus for transporting persons between spaced landings, comprising:

a load bearing conveyor including a plurality of moving platforms, each of said platforms having a plurality of spaced, upstanding cleats and intervening grooves which extend in the direction between the landings, a combplate at at least one of the landings having a plurality of spaced, depending teeth which mesh with the cleats of each platform during relative motion therebetween, and means carried by said combplate defining a pad portion adjacent to said teeth, said pad portion being dimensioned and positioned to contact said cleats before the teeth bottom in the grooves between said cleats, when the combplate is stressed by a deflecting load, preventing contact between said teeth and a moving platform, as each platform passes beneath said combplate.

2. The transportation apparatus of claim 1 wherein the pad portion is dimensioned and positioned to contact the cleats before the surfaces which extend between the teeth contact the cleats.

3. The transportation apparatus of claim 1 wherein the pad is an integral part of the combplate.

4. The transportation apparatus of claim 1 wherein the pad is a discrete member, and including means fixing the pad to the underside of the combplate.

5. The transportation apparatus of claim 4 wherein the pad is formed of a non-metallic material.

6. The transportation apparatus of claim 1 wherein the combplate includes a first portion having an upper load bearing side and a lower side, a second portion which includes the teeth, and means securing the first and second portions in assembled relation, and wherein the means carried by the combplate which defines the pad portion is carried by said first portion.

* * * * *